US012628798B2

(12) United States Patent
Wilhelm et al.

(10) Patent No.: US 12,628,798 B2
(45) Date of Patent: May 19, 2026

(54) PET TOY AND METHOD OF MANUFACTURING SAME

(71) Applicant: Doskocil Manufacturing Company, Inc., Arlington, TX (US)

(72) Inventors: Josiah Wilhelm, Arlington, TX (US); Ron Bagley, Arlington, TX (US); Vung Van Nguyen, Long an Province (VN)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 18/611,381

(22) Filed: Mar. 20, 2024

(65) Prior Publication Data

US 2024/0315204 A1 Sep. 26, 2024

Related U.S. Application Data

(60) Provisional application No. 63/453,637, filed on Mar. 21, 2023.

(51) Int. Cl.
*A01K 15/02* (2006.01)
(52) U.S. Cl.
CPC .................................. *A01K 15/026* (2013.01)

(58) Field of Classification Search
CPC ..... A01K 15/026; A01K 15/025; A01K 15/00
USPC .......................................... 119/707, 709, 710
See application file for complete search history.

(56) References Cited

U.S. PATENT DOCUMENTS

| | | | | |
|---|---|---|---|---|
| 2003/0079693 A1* | 5/2003 | Jager | ..................... | A01K 15/026 |
| | | | | 119/707 |
| 2004/0259460 A1* | 12/2004 | Persall, Sr. | .......... | A01K 15/026 |
| | | | | 446/20 |
| 2013/0000563 A1* | 1/2013 | Shen | ..................... | A01K 15/025 |
| | | | | 156/77 |
| 2018/0035644 A1* | 2/2018 | Wilson | .................. | A01K 15/026 |
| 2022/0287274 A1* | 9/2022 | Markham | ............ | A01K 15/026 |
| 2022/0295744 A1* | 9/2022 | Wilhelm | .............. | B29C 66/727 |
| 2022/0304279 A1* | 9/2022 | Jackson | ............... | A01K 15/026 |

* cited by examiner

*Primary Examiner* — Zoe Tam Tran
(74) *Attorney, Agent, or Firm* — Foley & Lardner LLP

(57) ABSTRACT

A method of manufacturing a pet toy includes preforming one or more rubber compound sheets, preforming a foam rubber core in a desired shape, enclosing the foam rubber core within the one or more rubber compound sheets so that the foam rubber core forms an inner part and the one or more rubber compound sheets form an outer part, and coating the outer part enclosing the inner part.

16 Claims, 8 Drawing Sheets

PET TOY AND METHOD OF MANUFACTURING SAME

CROSS-REFERENCE TO RELATED APPLICATIONS

This application claims the benefit under 35 U.S.C. § 119(e) of U.S. Provisional Application No. 63/453,637, filed Mar. 21, 2023. The entire disclosure of U.S. Provisional Application No. 63/453,637 is hereby incorporated by reference.

BACKGROUND

Field of the Disclosure

The present disclosure relates to a pet toy and its method of manufacturing. In particular, the present disclosure relates to an improved method of manufacturing and the resulting pet toy.

Background

Rubber foam pet toys are one form of pet toys which provide a safe and interactive way for pets to engage in physical activity. There are various methods for manufacturing rubber foam pet toys, but not all methods result in pet toys that are durable, non-toxic and attractive to pets.

SUMMARY

The present disclosure provides an improved method for manufacturing pet toys. The improved method of the present disclosure enables mass production of foam pet toys having complex shapes and being durable, non-toxic and attractive to pets.

In view of the state of the known technology, one aspect of the present disclosure is to provide a method of manufacturing a pet toy. The method includes preforming one or more rubber compound sheets, preforming a foam rubber core in a desired shape, enclosing the foam rubber core within the one or more rubber compound sheets so that the foam rubber core forms an inner part and the one or more rubber compound sheets form an outer part, and coating the outer part enclosing the inner part.

Another aspect of the present disclosure is to provide another method of manufacturing a pet toy. The method includes preforming one or more rubber compound sheets with a rubber compound, preforming a foam rubber core with the rubber compound and a blowing agent, and enclosing the foam rubber core within the one or more rubber compound sheets so that the foam rubber core forms an inner part and the one or more rubber compound sheets form an outer part.

Another aspect of the present disclosure is to provide a pet toy. The pet toy includes an outer part and an inner part. The outer part includes a rubber compound. The inner part includes the rubber compound and a blowing agent. The outer part and the inner part are formed together by (i) preforming one or more rubber compound sheets, (ii) preforming a foam rubber core, and (iii) enclosing the preformed foam rubber core within the one or more rubber compound sheets so that the foam rubber core forms an inner part and the one or more rubber compound sheets form an outer part.

Also, other objects, features, aspects and advantages of the disclosed pet toys and methods of manufacture will become apparent to those skilled in the art in the field of pet toy manufacturing from the following detailed description, which, taken in conjunction with the annexed drawings, discloses preferred embodiments of a pet toy and its method of manufacturing with various features.

BRIEF DESCRIPTION OF THE DRAWINGS

Referring now to the attached drawings which form a part of this original disclosure.

DETAILED DESCRIPTION

Figure 1:
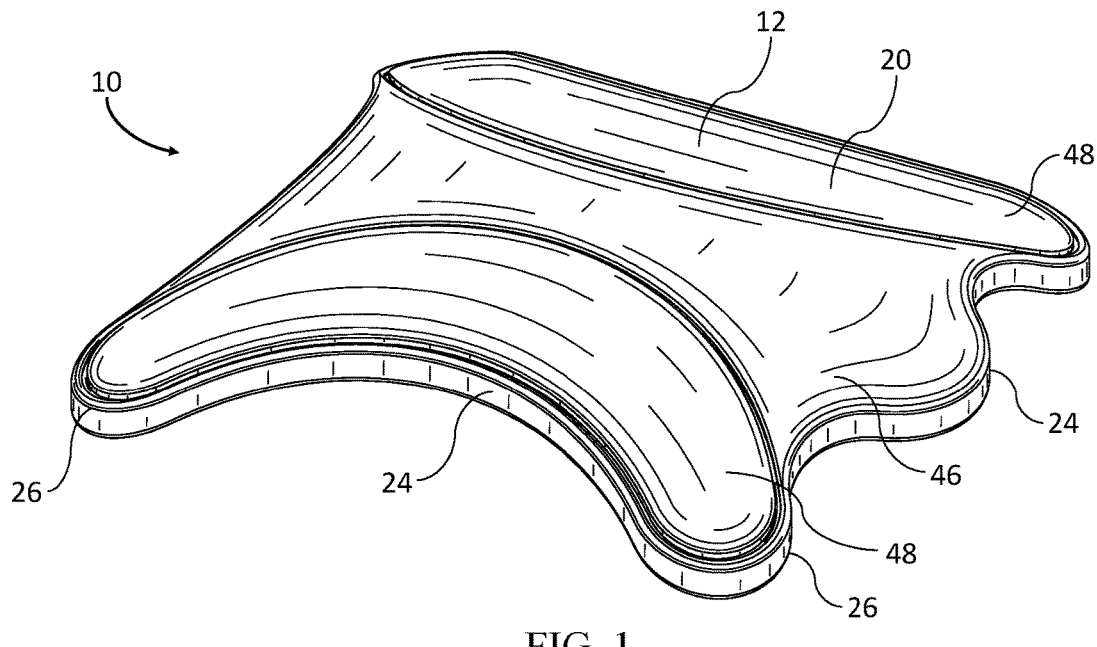
FIG. 1 illustrates a top perspective view of an example embodiment of a pet toy manufactured in accordance with the methods of with the present disclosure.
Figure 2:
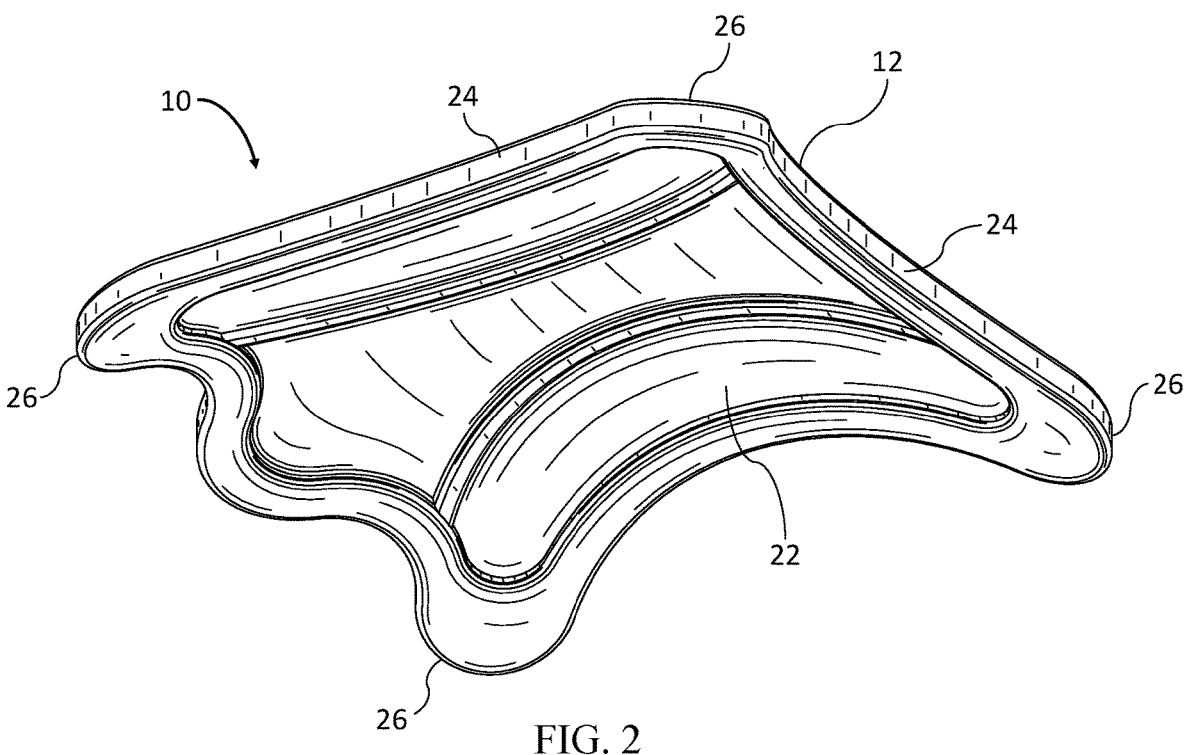
FIG. 2 illustrates a bottom perspective view of the pet toy of FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

FIGS. 1-8 illustrate an example embodiment of a pet toy 10 formed by the manufacturing methods of the present disclosure. As seen for example in FIG. 8, the pet toy 10 includes an outer part 12 and an inner part 14. In the illustrated embodiment, the outer part 12 includes a rubber compound, and the inner part 14 includes a rubber compound and a blowing agent. More specifically, the outer part 12 includes a rubber compound sheet 42 formed from a rubber compound, and the inner part 14 includes one or more preformed foam rubber cores 40 formed from a rubber compound and a blowing agent. The outer part 12 is more durable than the inner part 14 and acts as a barrier to prevent a pet from chewing up the inner part 14. The manufacture of the pet toy 10 with the outer part 12 and the inner part 14 is described in more detail below. The rubber compound can be a silicone compound or any other suitable material.

Figure 8:
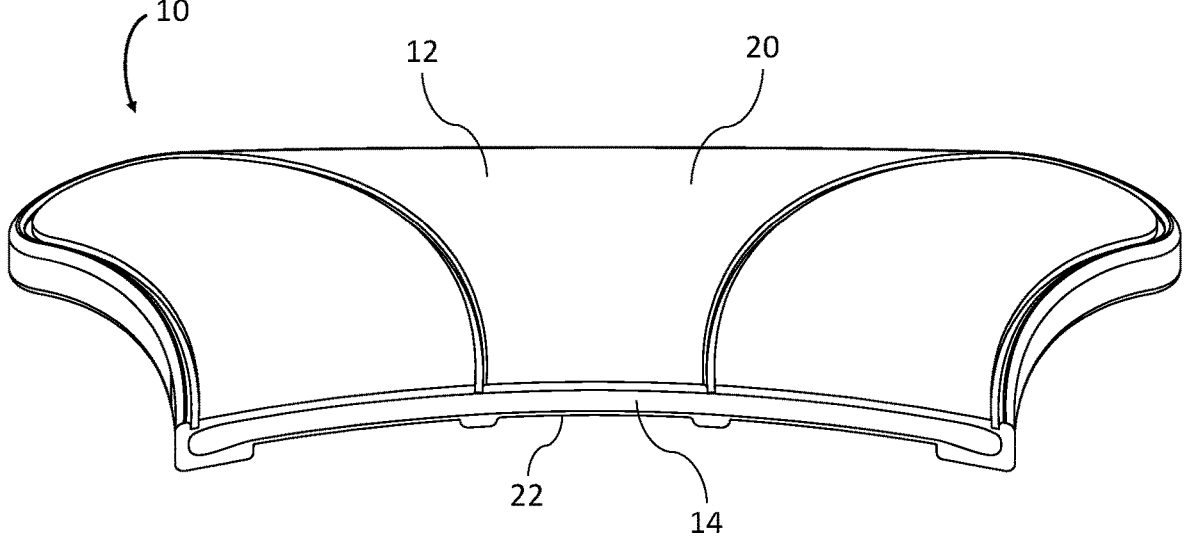
FIG. 8 illustrates a cross-section of the pet toy of FIG. 1 taken across lines 8-8 in FIG. 3.

The pet toy 10 includes a top surface 20, a bottom surface 22, and at least one side surface 24. More specifically, the outer part 12 includes the top surface 20, bottom surface 22, and at least one side surface 24. As shown in FIG. 8, the outer part 12 encloses the inner part 14 to form the top surface 20, bottom surface 22, and at least one side surface 24. The top surface 20, bottom surface 22, and at least one side surface 24 can be formed in a variety of shapes using the methods of the present disclosure. In the illustrated embodiment, the top surface 20 has a convex shape, the bottom surface 22 has a concave shape, and the side surface 24 has a serpentine shape. The methods of the present disclosure further enable the side surface 24 to have soft rounded corners 26 and different complex shapes on different sides of the side surface 24. As seen in FIGS. 1-4, in the illustrated embodiment, the entire side surface 24 is a continuous serpentine surface. The side surface 24 can also be described as having a front side surface 24*a*, a rear side surface 24*b*, a left side surface 24*c* and a right side surface 24*d*, as shown in FIGS. 3-7. In the illustrated embodiment, the front side surface 24*a* is serpentine, while the rear side surface 24*b*, left side surface 24*c* and right side surface 24*d* are concave. Those of ordinary skill in the art will recognize from this disclosure that other shapes are possible.

Figure 3:
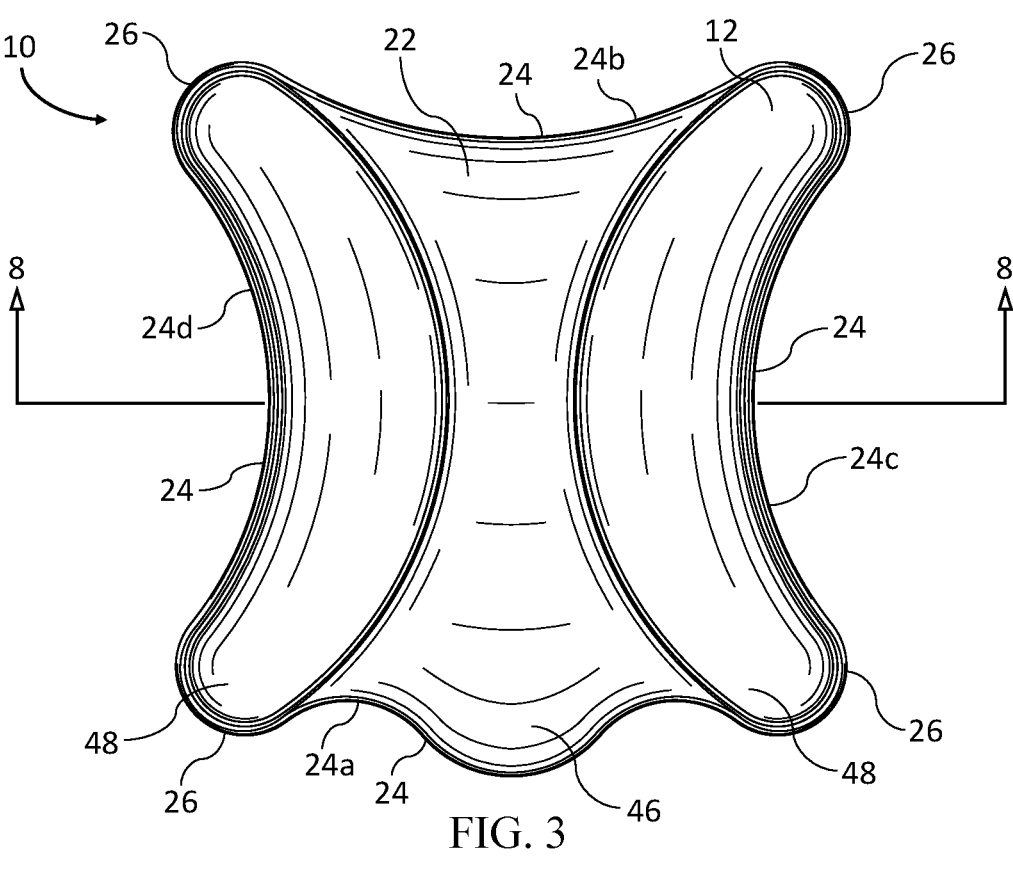
FIG. 3 illustrates a top plan view of the pet toy of FIG. 1.
Figure 4:
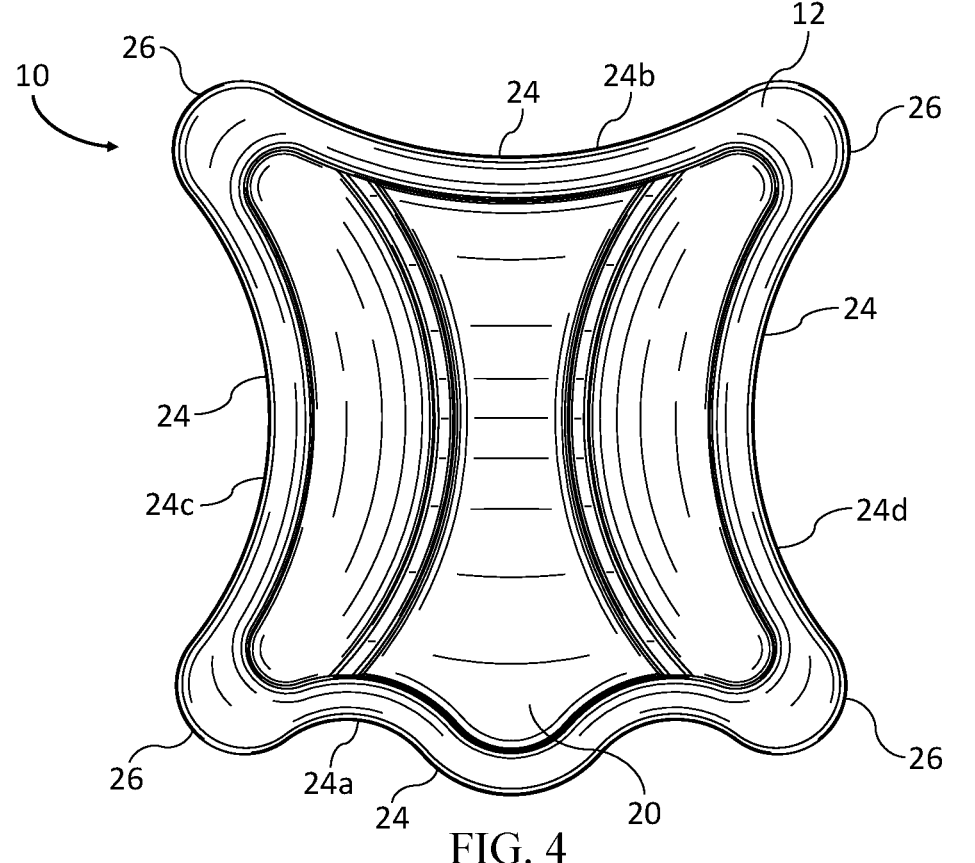
FIG. 4 illustrates a bottom plan view of the pet toy of FIG. 1.
Figure 5:
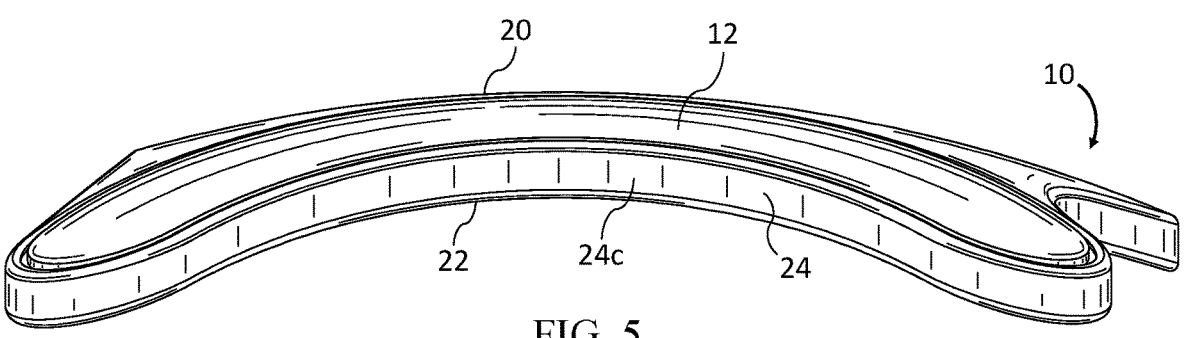
FIG. 5 illustrates a side elevation view of the pet toy of FIG. 1.
Figure 6:
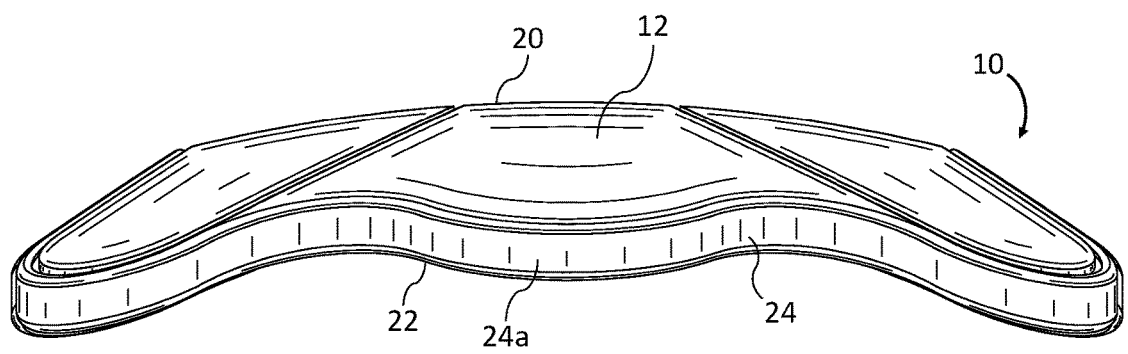
FIG. 6 illustrates a front elevation view of the pet toy of FIG. 1.
Figure 7:
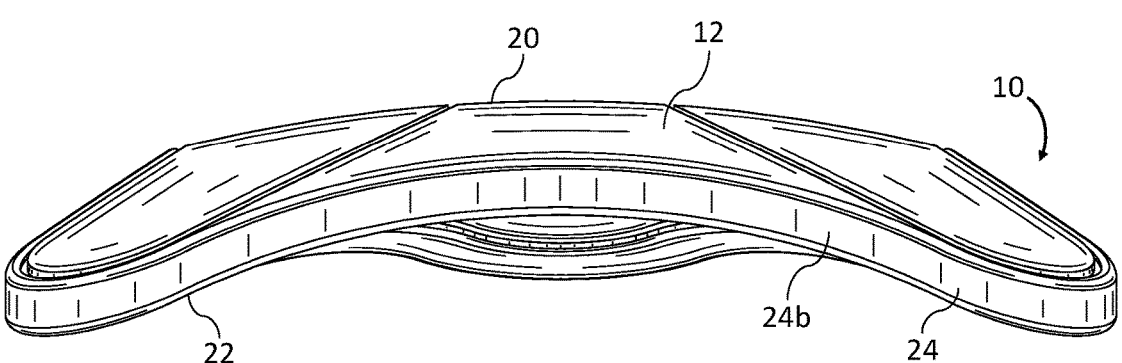
FIG. 7 illustrates a rear elevation view of the pet toy of FIG. 1.

The pet toy 10 includes at least one rubber coating. In the illustrated embodiment, the pet toy 10 is coated with a first rubber product 46 and a second rubber product 48, as shown in FIGS. 1 and 3. The first rubber product 46 and/or the second rubber product 48 can include a foam rubber product. The first rubber product 46 and/or the second rubber product 48 can include the same or a similar rubber compound as that used to create the outer part 12 and/or the inner part 14. In an embodiment, the first rubber product 46 and/or the second rubber product 48 provides a waterproof barrier on the outer part 12. The first rubber product 46 and/or the second rubber product 48 can also be used to further strengthen the durability of the outer part 12. In an embodiment, the first rubber product 46 and/or the second rubber product 48 can provide one or more desired colors for the pet toy 10.

Figure 9:
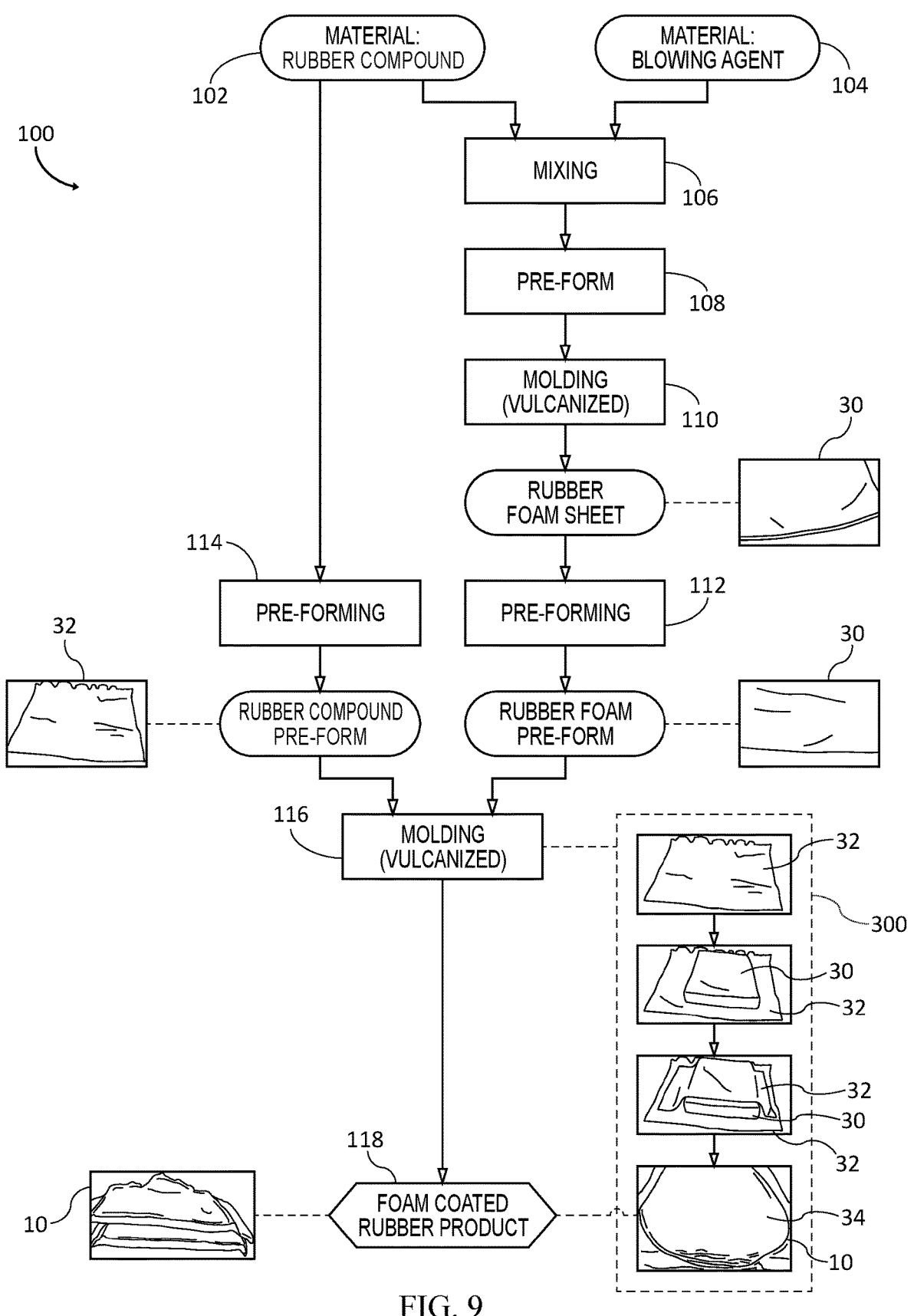
FIG. 9 illustrates an example embodiment of a method of manufacturing a pet toy in accordance with the present disclosure.
Figure 10:
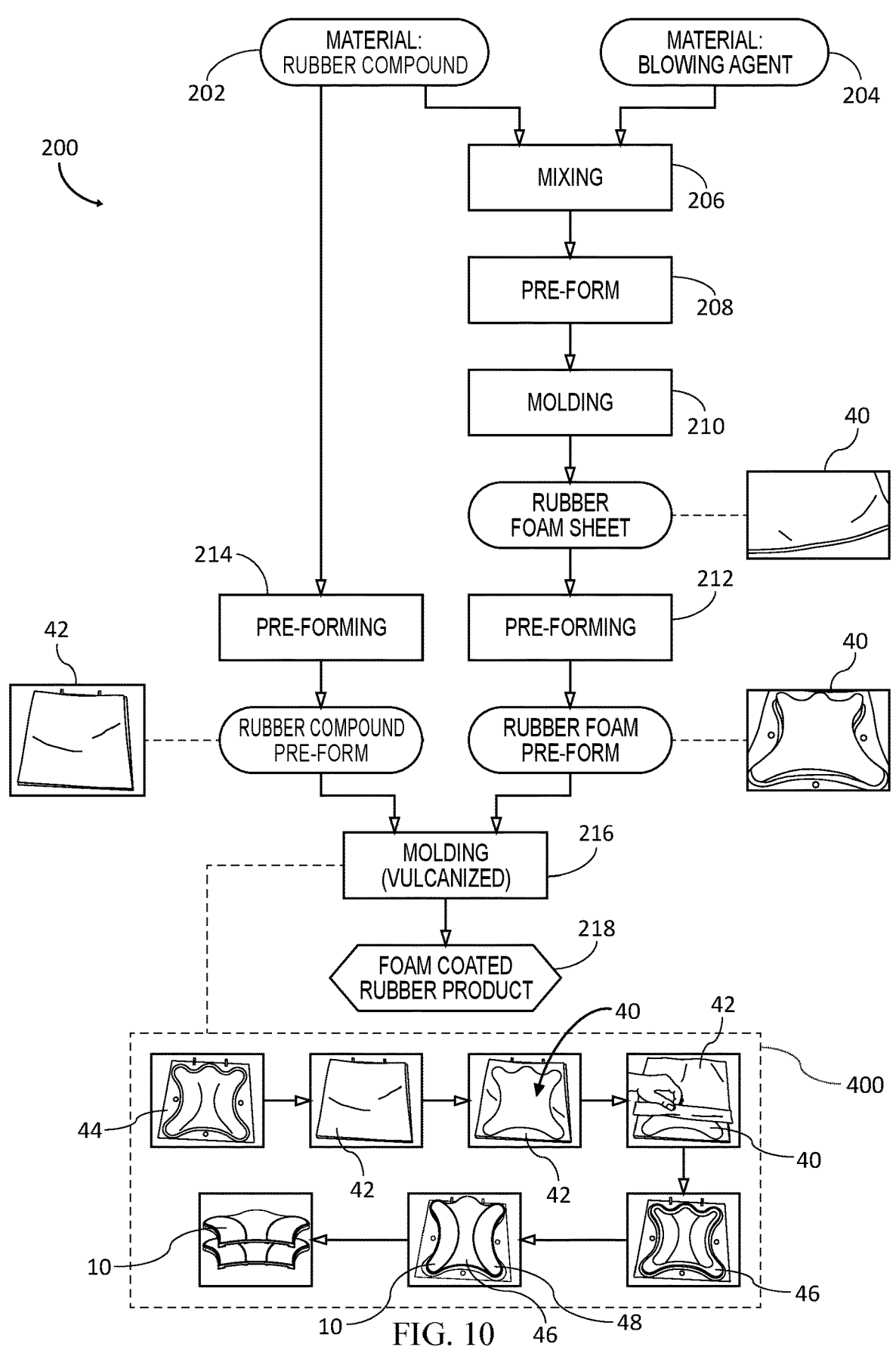
FIG. 10 illustrates an example embodiment of a method of manufacturing a pet toy in accordance with the present disclosure.

FIG. 9 illustrates an example embodiment of a method 100 of manufacturing a pet toy 10 with a basic shape in accordance with the present disclosure. FIG. 10 illustrates a similar example embodiment of a method 200 of manufacturing a pet toy 10 with a more complex shape in accordance with the present disclosure. Those of ordinary skill in the art will recognize from this disclosure that certain steps can be added, omitted or adjusted without departing from the spirit and scope of the methods 100, 200.

At steps 102 and 202, a rubber compound is provided. The rubber compound can include a base polymer, a filler and/or other chemicals. The rubber compound can include reinforcing agents, such as carbon black, colored pigments, curing or vulcanizing agents, activators, plasticizers, accelerators, antioxidants or antiradiation additives. Those of ordinary skill in the art will recognize from this disclosure that other rubber compounds are suitable for use in the methods 100, 200 described herein.

At steps 104 and 204, a blowing agent is provided. The blowing agent can include a chemical that generates inert gases on heating to cause the rubber compound to assume a desired cellular structure of a foam. The blowing agent can include, for example, citric acid, sodium bicarbonate, or azodicarbonamide. Those of ordinary skill in the art will recognize from this disclosure that other blowing agents are suitable for use in the methods 100, 200 described herein.

At steps 106 and 206, some of the rubber compound is mixed with the blowing agent to form a mixture.

At steps 108 and 208, the mixture is preformed into a desired shape. The desired shape can be one which enables and/or simplifies the following molding and preforming steps.

At steps 110 and 210, the preformed mixture is molded into one or more foam rubber cores 30, 40. More specifically, the preformed mixture is vulcanized. In an embodiment, the preformed mixture is vulcanized to increase the rigidity and/or durability of the one or more preformed foam rubber cores 30, 40.

At steps 112 and 212, the foam rubber core 30, 40 is preformed into the inner part 14 having a desired shape, for example, by being cut in the desired shape. The desired shape can correspond to the final shape intended for the pet toy 10 at the end of the method 100, 200. In FIG. 9, at step 112, the preformed shape is a rectangle. In FIG. 10, at step 212, the preformed shape is the more complex serpentine shape of the pet toy 10 shown in FIGS. 1-8.

At steps 114 and 214, some of the rubber compound provided at step 102 or 202 is preformed to create one or more rubber compound sheets 32, 42. One or more rubber compound sheets 32, 42 form the outer part 12 of the pet toy 10. As illustrated, the rubber compound is formed into a much thinner rubber compound sheet 32, 42 than the foam rubber core 30, 40.

Figure 11:
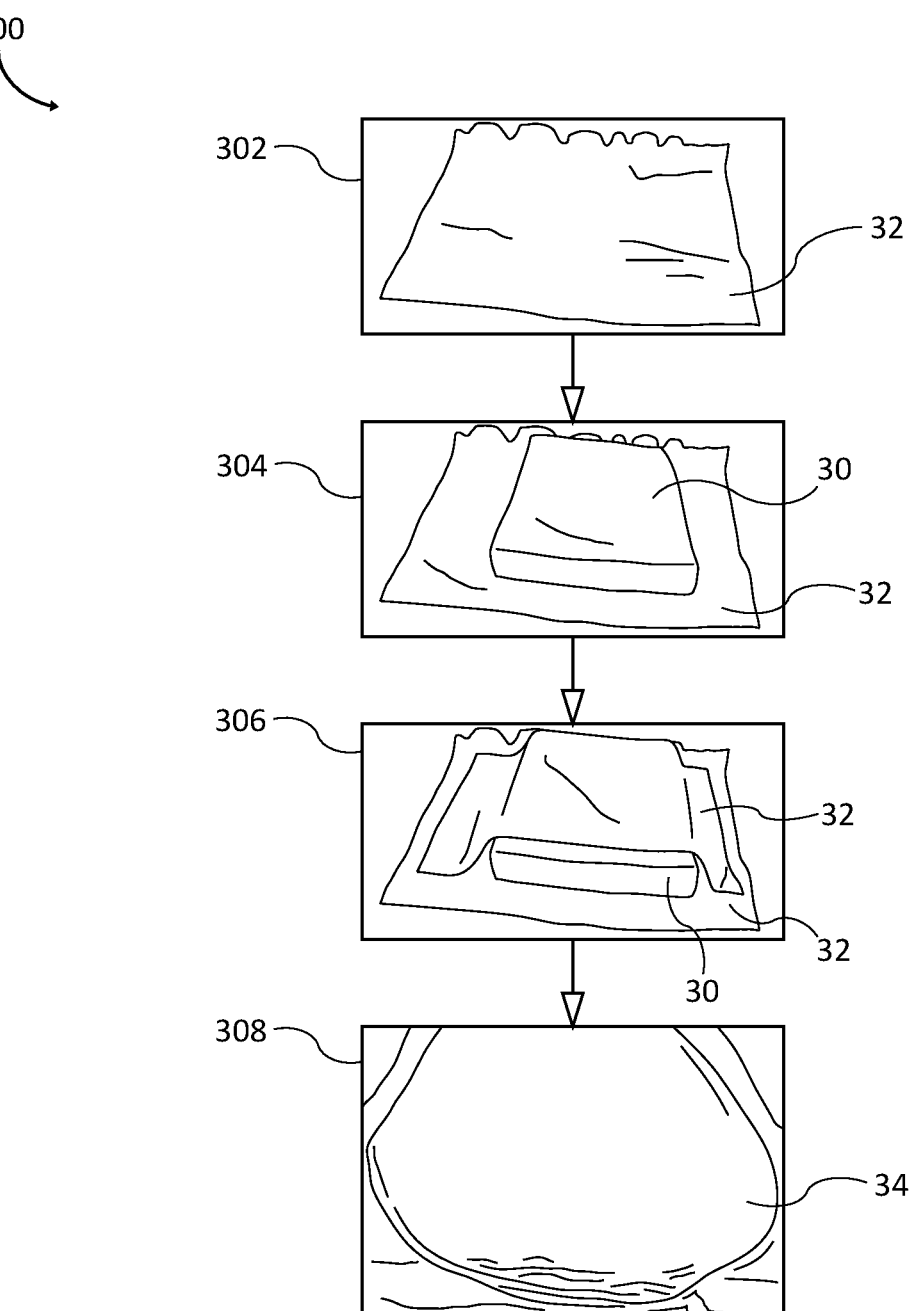
FIG. 11 illustrates an example embodiment of a method of molding an outer part and an inner part during the method of FIG. 9.
Figure 12:
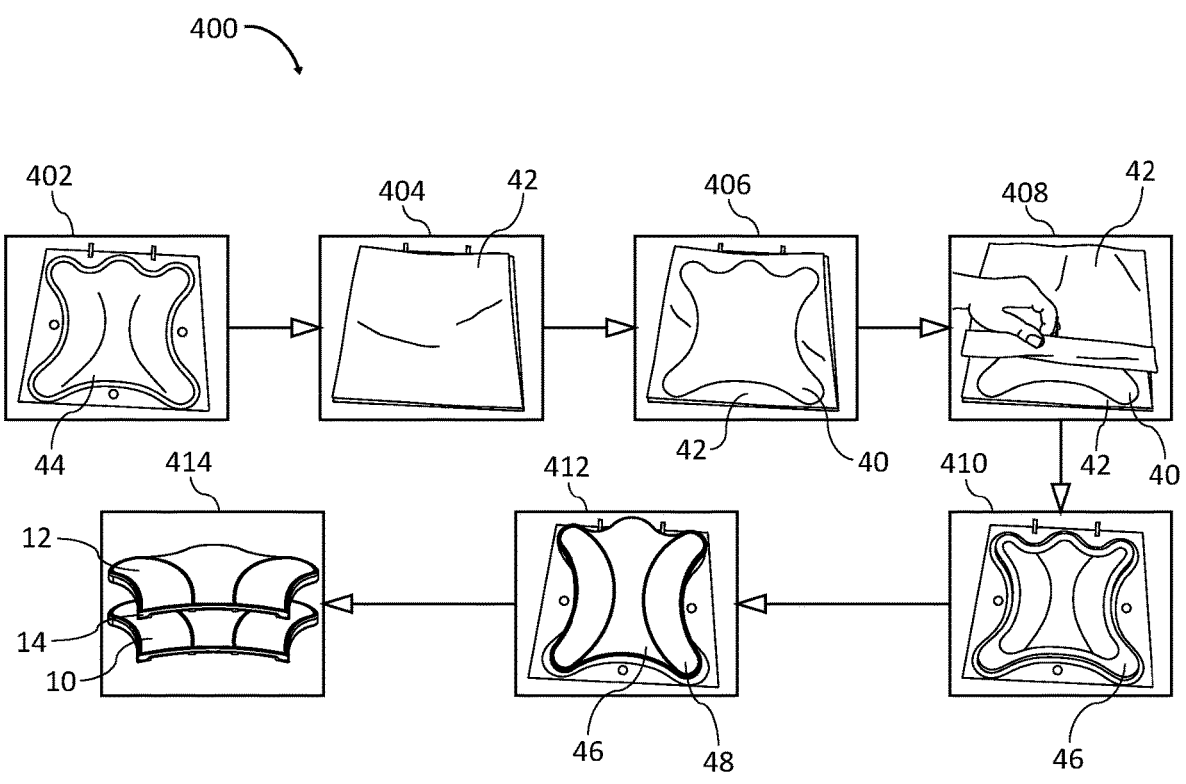
FIG. 12 illustrates an example embodiment of a method of molding an outer part and an inner part during the method of FIG. 10.

At steps 116 and 216, the inner part 14 formed by the foam rubber core 30, 40 and the outer part 12 formed by the rubber compound sheet 32, 42 are molded together. More specifically, outer part 14 formed by the one or more rubber compound sheet 32, 42 is molded around the inner part 14 formed by the foam rubber core 30, 40 to enclose the inner part 14 formed by the foam rubber core 30, 40. The molding step can include a vulcanization process that increases the rigidity and/or durability of the pet toy 10. FIG. 11 illustrates an example embodiment of a method 300 of molding a foam rubber core 30 and a rubber compound sheet 32 at step 116 of the method 100. FIG. 12 illustrates an example embodiment of a method 400 of molding a foam rubber core 40 and a rubber compound sheet 42 at step 216 of the method 200.

At steps 118 and 218, the rubber compound sheet 32, 42 now covering the foam rubber core 30, 40 is coated with a rubber product. The rubber product can be, for example, a sprayable or brushable rubber foam product which adverse to the outer part 12. The rubber product can include the same or similar rubber compound provided at step 102, 202. In an embodiment, the rubber product can provide a waterproof barrier on the outer part 12. In an embodiment, the rubber product can be a desired color of the pet toy 10.

FIG. 11 illustrates an example embodiment of a method 300 of molding performed at step 116 of the method 100. Those of ordinary skill in the art will recognize that certain steps can be added, omitted or adjusted without departing from the spirit and scope of the method 300.

At step 302, a rubber compound sheet 32 forming the bottom surface 22 of the outer part 12 is placed on a surface.

At step 304, a preformed foam rubber core 30 forming the inner part 14 is placed on top of the rubber compound sheet 32.

At step 306, a rubber compound sheet 32 forming the top surface 20 of the outer part 12 is placed on top of the preformed foam rubber core 30. The rubber compound sheet 32 can be the same sheet used at step 302 (e.g., folded around the preformed foam rubber core 30) or a second rubber compound sheet 32. The rubber compound sheet(s) 32 are sealed around the foam rubber core 30 to enclose the foam rubber core 30 within the rubber compound sheet 32. In an embodiment, the molding step sealing the rubber compound sheet(s) 32 around the preformed foam rubber core 30 can include a vulcanization process, for example, which treats the rubber compound sheet 32 and the foam rubber core with sulfur. Extraneous rubber compound sheet 32 not being used to enclose the foam rubber core 30 can be removed. The rubber compound sheet 32 thus forms the outer part 12 of a pet toy 10 and the preformed foam rubber core 30 forms the inner part 14 of the pet toy.

At step 308, the outer part 10 of the pet toy 10 is coated with a rubber product. The rubber product can include a foam rubber product. The rubber product can include the same or similar rubber compound provided at step 102. In an embodiment, the rubber product can provide a waterproof barrier on the outer part 12. In an embodiment, the rubber product can be a desired color of the pet toy 10.

FIG. 12 illustrates an example embodiment of a method 400 of molding performed at step 216 of the method 200. Those of ordinary skill in the art will recognize that certain steps can be added, omitted or adjusted without departing from the spirit and scope of the method 400.

At step 402, a mold 44 is provided. In the illustrated embodiment, the mold is same general shape as the preformed foam rubber core 40 and/or pet toy 10.

At step 404, a rubber compound sheet 42 forming the bottom surface 22 of the outer part 12 is placed on a surface.

At step 406, a preformed foam rubber core 40 forming the inner part 14 is placed on top of the rubber compound sheet 42.

At step 408, a rubber compound sheet 42 forming the top surface 20 of the outer part 12 is placed on top of the preformed foam rubber core 40. The rubber compound sheet 42 can be the same sheet used at step 404 (e.g., folded around the preformed foam rubber core 40) or a second sheet of rubber compound sheet 42. Using the mold 44, the rubber compound sheet(s) 42 are sealed around the foam rubber core 40 to enclose the foam rubber core 40 within the rubber compound sheet(s) 42. In an embodiment, the molding step sealing the rubber compound sheet(s) 42 around the preformed foam rubber core 40 can include a vulcanization process, for example, which treats the rubber compound sheet 42 and the foam rubber core with sulfur while in the mold 44. Extraneous rubber compound sheet 42 not being used to enclose the preformed foam rubber core 40 can be removed. The rubber compound sheet 42 thus forms the outer part 12 of a pet toy 10 and the preformed foam rubber core 40 forms the inner part 14 of the pet toy 10.

At step 410, the outer part 12 of the pet toy 10 is coated with a first rubber product 46. The outer part 12 can be coated while the pet toy 10 is still in the mold 44. The first rubber product 46 can include a foam rubber product. The first rubber product 46 can include the same or similar rubber compound provided at step 202. In an embodiment, the first rubber product can provide a waterproof barrier on the outer part 12. In an embodiment, the first rubber product can be a desired color of the pet toy 10.

At step 412, the outer part 12 of the pet toy 10 is coated with a second rubber product 48. The outer part 12 can be coated while the pet toy 10 is still in the mold 44. The second rubber product 48 can be different from the first rubber product. The second rubber product 48 can include a foam rubber product. The second rubber product 48 can include the same or similar rubber compound provided at step 202. In an embodiment, the second rubber product can provide a waterproof barrier on the outer part 12. In an embodiment, the second rubber product can be a desired color of the pet toy 10.

Step 414 shows a cross-section of the resulting pet toy 10 having the outer part 12 formed by the rubber compound sheet 42 and an inner part 14 formed by the preformed foam rubber core 40.

The embodiments described herein provide improved methods of manufacturing pet toys. These methods are advantageous, for example, because they enable mass production of foam pet toys having complex shapes and being durable, non-toxic and attractive to pets. It should be understood that various changes and modifications to the methods and the pet toys described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section" or "part" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A pet toy comprising:
an outer part including a rubber compound; and
an inner part including the rubber compound and a blowing agent,
the outer part and the inner part formed together by (i) preforming one or more rubber compound sheets, (ii) preforming a foam rubber core, and (iii) enclosing the foam rubber core within the one or more rubber compound sheets so that the foam rubber core forms the inner part and the one or more rubber compound sheets form the outer part;
wherein the one or more rubber compound sheets are coated with a first rubber product and a second rubber product, the first rubber product and the second rubber product configured to confront an exterior environment.

2. The pet toy of claim 1, wherein the first rubber product formed by a first compound, the second rubber product formed by a second compound, the first compound different from the second compound.

3. The pet toy of claim 1, wherein:

the outer part includes a side surface with a serpentine shape, the serpentine shape including:

a first curve;

a second curve; and a third curve extending between the first curve and the second curve.

4. The pet toy of claim 1, wherein:

the outer part includes a top surface with a convex shape.

5. The pet toy of claim 1, wherein;

the outer part includes a bottom surface with a concave shape.

6. The pet toy of claim 1, wherein the first rubber product has a first color and the second rubber product has a second color.

7. The pet toy of claim 1, wherein the first rubber product and the second rubber product are configured to waterproof the pet toy.

8. The pet toy of claim 7, wherein the first rubber product and the second rubber product are sprayable rubber foam products.

9. The pet toy of claim 1, wherein the outer part includes:

a top surface with a concave shape;

a bottom surface with a convex shape;

a rear side surface extending between the top surface and the bottom surface; and a front side surface extending between the top surface and the bottom surface, the front side surface having a serpentine shape.

10. The pet toy of claim 9, wherein the outer part includes:

a right side surface extending between the top surface, the bottom surface, the rear side surface, and the front side surface; and a left side surface extending between the top surface, the bottom surface, the rear side surface, and the front side surface;

wherein a profile of the right side surface is substantially symmetrical to a profile of the left side surface.

11. The pet toy of claim 1, wherein an upper surface of the outer part includes:

a first side portion coated in the first rubber product;

a second side portion coated in the first rubber product; and a center portion extending between the first side portion and the second side portion, the center portion coated in the second rubber product.

12. The pet toy of claim 11, wherein the first rubber product is a first color and the second rubber product is a second color different from the first color.

13. The pet toy of claim 1, wherein forming the inner part and the outer part together includes vulcanizing.

14. The pet toy of claim 1, wherein preforming the foam rubber core includes vulcanizing the foam rubber core.

15. The pet toy of claim 1, wherein enclosing the foam rubber core within the one or more rubber compound sheets includes vulcanizing the foam rubber core and the one or more rubber compound sheets.

16. A pet toy comprising:

an outer part including a rubber compound; and an inner part including the rubber compound and a blowing agent, the outer part and the inner part formed together by (i) preforming one or more rubber compound sheets, (ii) preforming a foam rubber core, preforming including vulcanizing the foam rubber core, and (iii) enclosing the foam rubber core within the one or more rubber compound sheets so that the foam rubber core forms the inner part and the one or more rubber compound sheets form the outer part.

\* \* \* \* \*